May 19, 1925.
W. F. M. ROSE
1,538,301
LAMP FOR MOTOR ROAD VEHICLES
Filed July 22, 1924    2 Sheets-Sheet 1
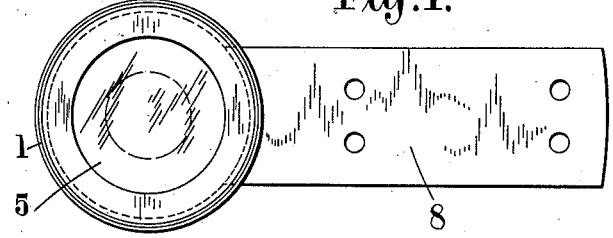
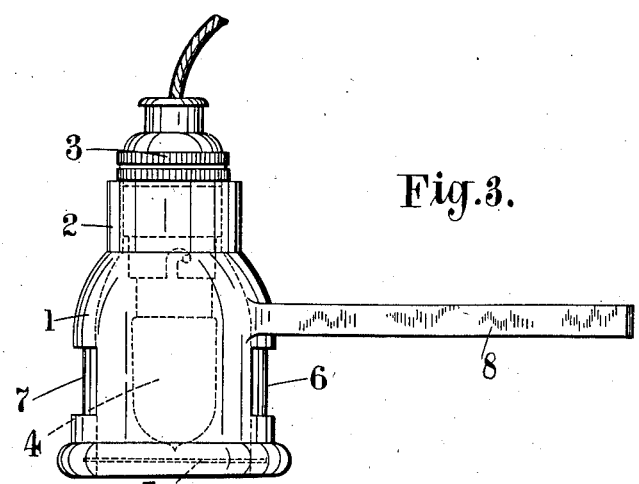
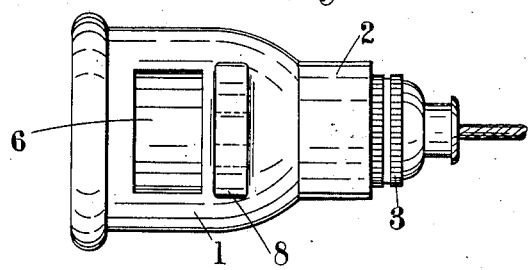
INVENTOR
William Francis Meekam Rose
BY
Robert Phillips.
ATTORNEY Patented May 19, 1925.

1,538,301

UNITED STATES PATENT OFFICE.

WILLIAM FRANCIS MEEKAN ROSE, OF HAMMERSMITH, LONDON, ENGLAND.

LAMP FOR MOTOR ROAD VEHICLES.

Application filed July 22, 1924. Serial No. 727,563.

*To all whom it may concern:*

Be it known that I, WILLIAM FRANCIS MEEKAN ROSE, a subject of the King of Great Britain and Ireland, residing at 19, Stamford Brook Mansions, Goldhawk Road, Hammersmith, in the administrative county of London, England, have invented a new and useful Improvement in Lamps for Motor Road Vehicles, of which the following is a full and complete specification.

This invention relates to lamps for motor road vehicles and consists of a combined body adapted to receive an electric bulb and flexible arm for supporting said body and it has for its object to simplify and thereby cheapen production. A further object is to produce a complete unit ready for attachment, and a still further object is a construction which will protect not only the body of the lamp but also the electric bulb from damage through collision.

I attain these ends by constructing the body of the lamp and the supporting bracket by which it is mounted on the vehicle of rubber or like material, the body part being of such a nature as will give it the desired stiffness to be indeformable and thereby able to withstand telescoping or collapsing if it should be accidentally struck or come into contact with an obstruction, and the bracket being of such a nature as will give it the necessary flexibility to permit the lamp to give way under either of the aforesaid conditions.

In the accompanying drawings which show a rear or tail light embodying this invention:—

Figure 4:
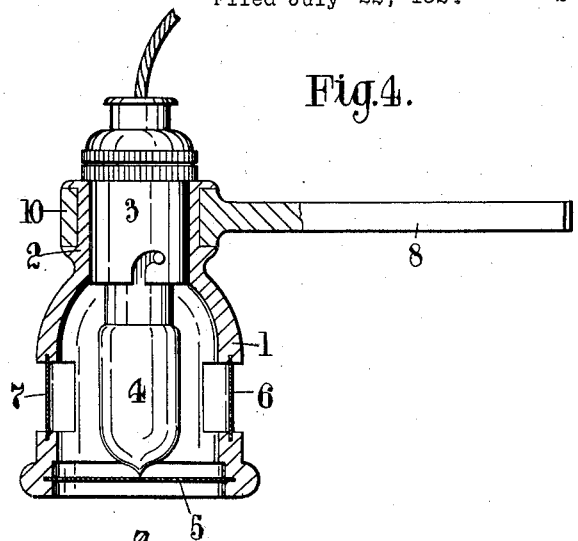
Figure 5:
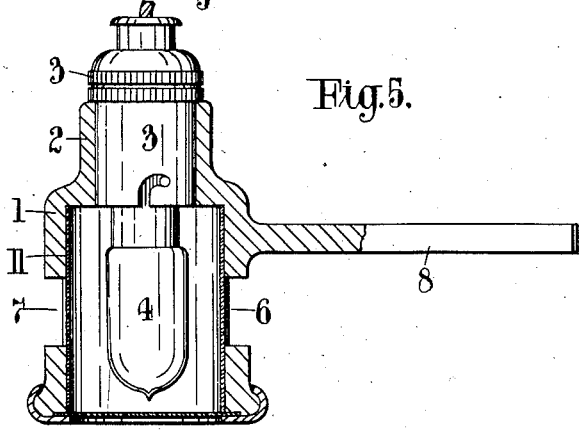
Figure 6:
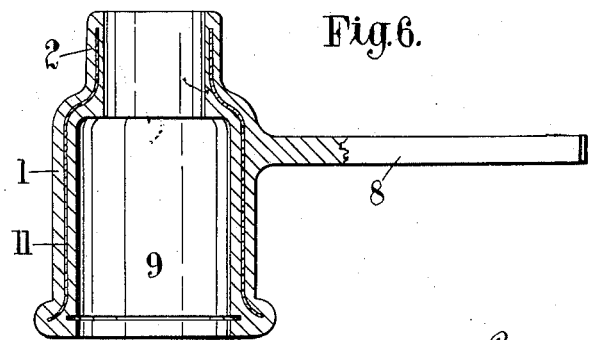

Figures 1, 2, and 3 are views in front elevation, side elevation and plan respectively showing one form of construction, and Figures 4, 5, and 6 are views in section showing alternative forms of construction.

Throughout the views similar parts are marked with like numerals of reference.

Both the body 1 and the supporting arm 2 are made of rubber or like material the former being made of sufficient stiffness to be indeformable and the latter being of such a construction that while it has the necessary stiffness in the vertical plane to support the weight of the lamp it has the necessary flexibility in the horizontal plane to form a spring or elastic arm.

The body 1 which is of cylindrical form has a socket 2 at one end adapted to receive the holder 3 for the electric bulb 4 and has at the other end a glazed window 5 which forms the rear light. When it is required to have side lights as well as a rear light glazed windows 6 and 7 are formed in the opposite sides of the body. When such side windows are provided the body 1 can be made of the same quality of rubber as the arm 8 as the incision of pieces of mica for the windows gives the body the necessary stiffness to make it indeformable. In the edge or edges of the apertures forming the windows are grooves 9 into which the pieces of mica or glass can be placed by suitably springing the rubber body.

The body 1 and the arm 8 are either moulded in one piece as shown in Figures 1, 2, and 3 or in two pieces which are subsequently assembled as shown in Figure 4, in which construction the socket 2 is sprung into an apertured ring 10 formed in the arm 8 and is securely gripped in same by the expansion of the socket 2 by the insertion of the bulb holder 3.

Alternatively to stiffening the body 1 when it is made of soft rubber by the pieces of mica or glass employed for the side windows, such a body may be stiffened by the use of a rigid frame such as 11 which may either take the form of a cylinder of mica inserted in the body after vulcanization as shown in Figure 5, or of a metal frame embodied in the wall of the body before vulcanization as shown in Figure 6.

The arm 8 is provided with a suitable number of holes for the bolts or screws employed to fix same on the body or undercarriage of the vehicle.

What I claim is:—

1. An electric lamp for vehicles comprising a body part made of rubber or like material stiff enough to be indeformable, and a supporting arm made of rubber or like material stiff enough to stand up and support the body of the lamp under normal conditions but flexible enough to be bent out of shape under external pressure and resilient enough to cause the body part to resume its original position when such external pressure is removed, said body part being fitted with a transparent element and so shaped as to enclose and house the electric bulb.

2. An electric lamp for vehicles comprising a body part made of rubber or like material stiff enough to be indeformable and a supporting arm integral therewith which is made of a similar material stiff enough to stand up and support the body of the lamp under normal conditions and flexible and resilient enough to bend under external pressure and to restore the body part to its original position when such external pressure is removed, said body part being fitted with a window element and so shaped as to enclose and house the electric bulb.

3. In combination, a body for an electric lamp and a supporting arm for said body both made of rubber the body of a hard nature such as vulcanite so that it is indeformable and the arm being of a soft nature so that it will flex in the horizontal plane and thereby allow the lamp to give way under external pressure.

4. In combination a body for an electric lamp and a supporting arm for said body both being made of rubber and moulded in one piece the arm being made of soft rubber that it will flex in the horizontal plane and thereby allow the lamp to give way under impact and the body being made of hard rubber such as vulcanite so that it is indeformable.

5. A combined electric lamp holder and supporting bracket for motor road vehicles, comprising an open-ended cylindrical indeformable body in one end of which is a bulb holder with terminals for the lead and in the other end of which is a glazed window, and an integral flexible rubber arm adapted to support said body.

6. A combined electric lamp holder and supporting bracket for motor road vehicles, comprising an open-ended cylindrical body in one end of which is a bulb holder with terminals for the lead and in the other end of which is a glazed window, and a supporting arm formed integral with said body said arm being made of soft rubber and so constructed and arranged as to be flexible in the horizontal plane and said body being made of hard rubber so as to be indeformable.

7. A combined electric lamp holder and supporting bracket comprising an open-ended cylindrical body one end of which is adapted to receive a holder for an electric bulb and the other end of which is adapted to form a rear window said body also having apertures forming side windows, and a supporting arm of greater depth than thickness, said body and said arm being both made of rubber and moulded so as to be integral, the rubber of said body being hard and inelastic so as to make it indeformable and the rubber of said arm being soft so as to make it flexible.

WILLIAM FRANCIS MEEKAN ROSE.